United States Patent Office 3,462,616
Patented Aug. 19, 1969

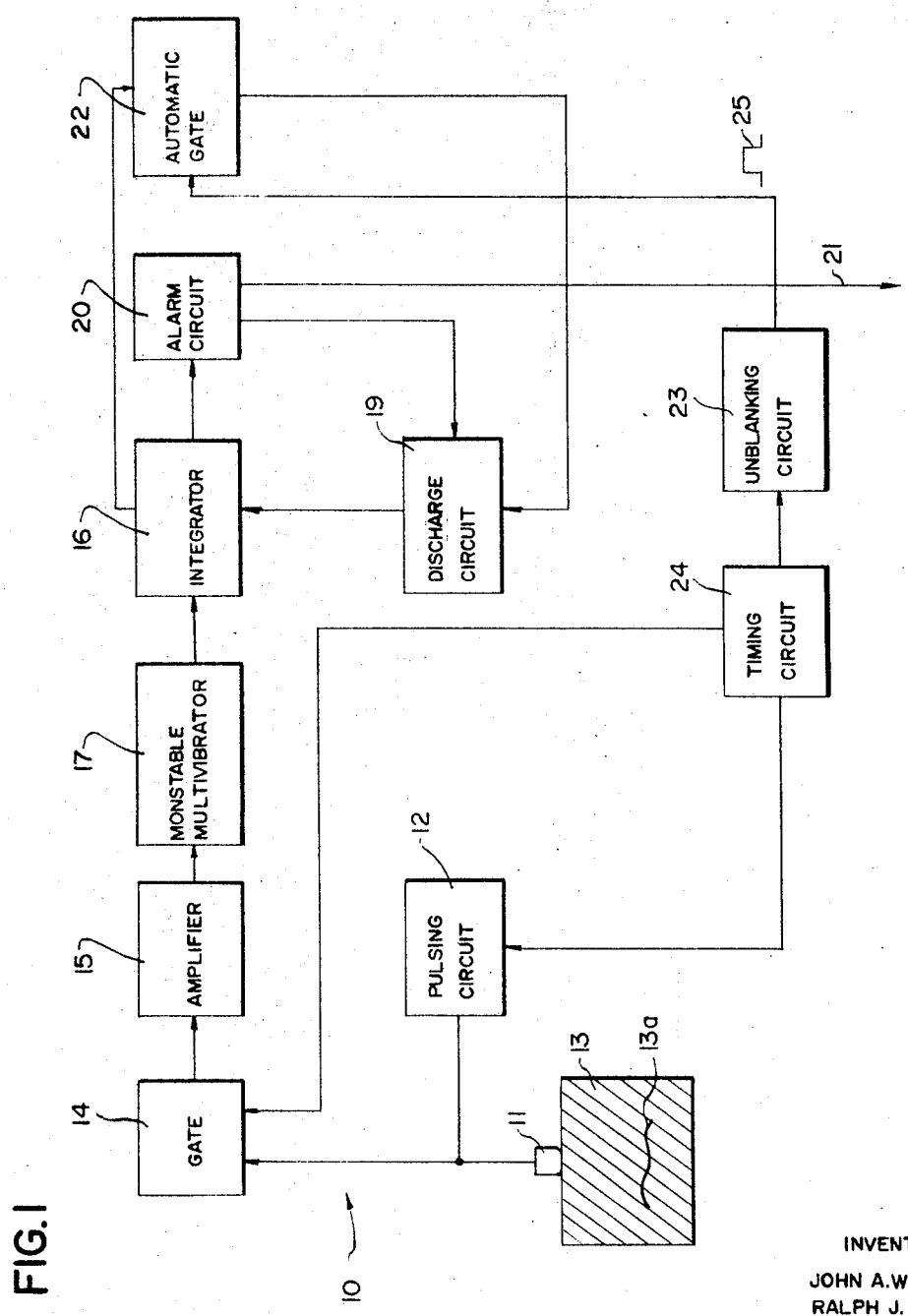

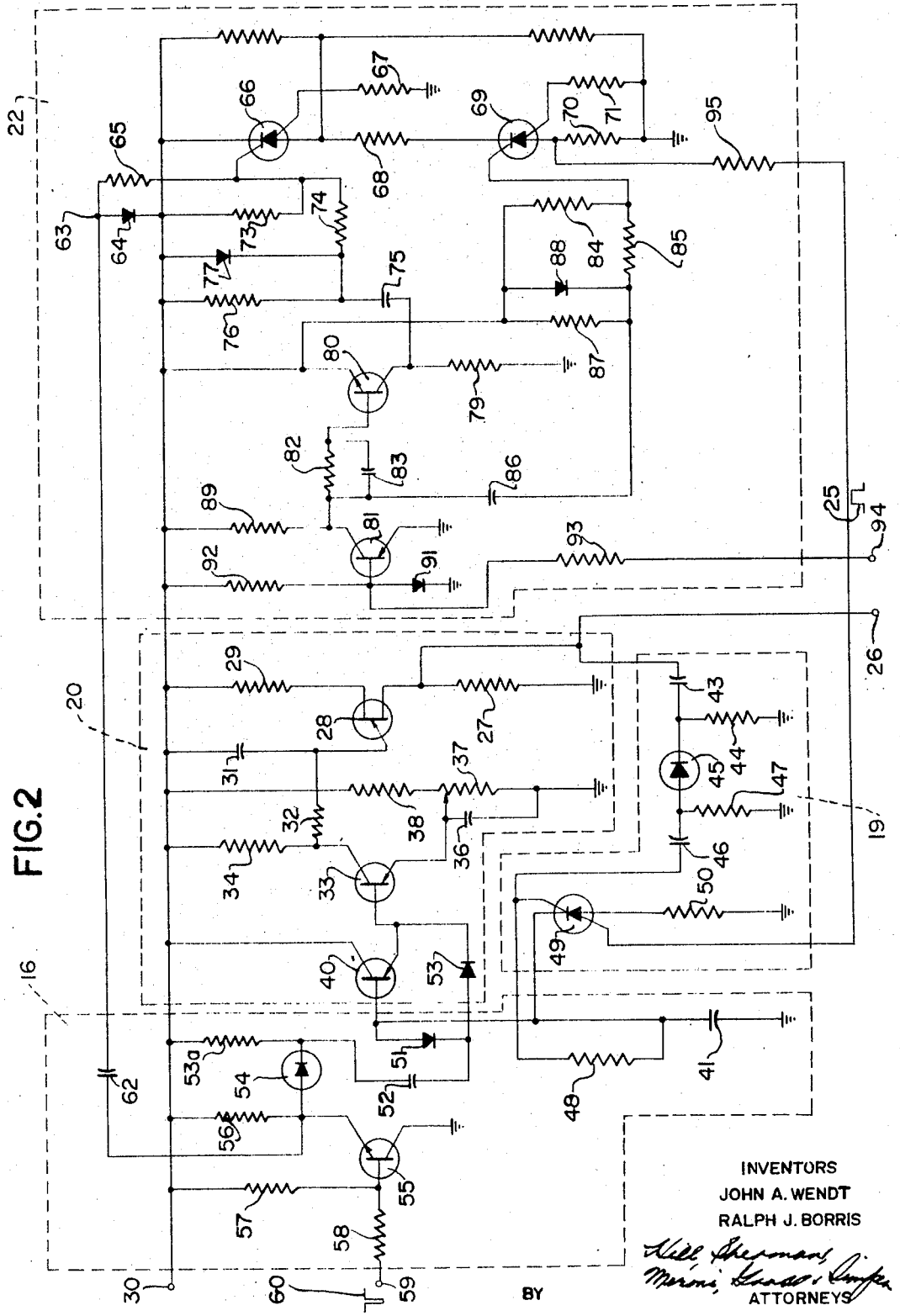

1

3,462,616
INTEGRATOR ALARM SYSTEM
John A. Wendt, Park Ridge, and Ralph J. Borris, Des Plaines, Ill., assignors to Magnaflux Corporation, Chicago, Ill., a corporation of Delaware
Filed Sept. 13, 1965, Ser. No. 486,694
Int. Cl. H03k 17/28
U.S. Cl. 307—246                2 Claims

ABSTRACT OF THE DISCLOSURE

A testing system, preferably a pulse-echo ultrasonic system which develops signals in response to defects in a part, in which an integrator circuit discriminates against noise signals. The integrator circuit includes a storage capacitor which is progressively charged from an initial condition to a second condition in response to defect signals, a reset circuit which discharges the capacitor to the initial condition in response to the absence of signals and an output circuit which is triggered only when the capacitor is charged to the second condition.

---

The present invention relates to an integrator alarm system and more particularly to a system which produces an output signal in response to a certain number of input pulse signals and which discriminates against extraneous transient signals to provide a high degree of accuracy and reliability.

Many features of the invention have a variety of uses, but the system as disclosed herein is particularly designed for use in ultrasonic non-destructive testing wherein a transducer periodically induces a pulse of ultrasonic energy into a portion of a body being tested and receives echo-pulses corresponding to structural defects of the tested portion. If the body has such a defect in the portion being tested, an echo-pulse is received, and the apparatus may be designed to cause the body to be rejected and discarded.

Such systems have been highly effective in many applications, but it has been practically impossible to distinguish between information signals actually caused by defects in the tested body and transient pulses which occasionally occur in the circuit lines. Thus, good materials are often rejected along with defective ones because of the all-too-frequent appearance of such circuit transients. Considerable waste and loss results from such false rejections due to the wide use of this method of inspecting and testing materials.

Attempts have been made to limit unwanted rejections by devising testing systems which include integrator circuits and require multiple defect signals to activate the reject mechanisms, thereby lowering somewhat the chance of rejections due to line transients. However, these systems still do not differentiate between actual defect signals and transient signals, and any combination of the two which equal the required number of signals will still cause the reject mechanisms to operate. Thus, the systems continue to reject non-defective as well as defective materials.

In accordance with an important feature of the present invention it is recognized that when an actual defect is present in the portion of the material being tested, a defect echo-pulse will be produced by each output pulse of the testing transducer. An integrator circuit requiring a pre-set number of defect signals before triggering is included in an ultrasonic testing system having a transducer which is caused to pulse periodically. Defect echo-pulse signals from the transducer are stored in the integrator circuit until the required number for triggering an alarm have been received, but if the transducer pulses and no echo-pulse signal is received from the portion of the material being tested a circuit in the system discharges the integrator circuit and the whole storing process must begin anew. If the required number of defect echo-pulse signals occur consecutively with the pulsing of the transducer, the charged integrator circuit causes an alarm mechanism to activate and the material being tested may be rejected. With this arrangement, defective materials are rejected as desired while the chance of rejection of non-defective materials is reduced to virtual non-existence.

According to another feature of the invention the one-pulse recovery integrator system is used together with a threshold device in a testing system. Defect signals may be fed directly to the threshold device which is only triggered by signals above a certain threshold value. The threshold device may then be connected to the integrator system, which will thus receive pulses only in response to defects above a predetermined threshold value. With this arrangement it is possible to pre-set the size of defect which will cause alarm or rejection while being protected against alarms or rejections due to circuit transients.

According to another feature of this invention the one-pulse recovery integrator system is used in an ultrasonic testing system with a transducer which moves across the surface of the body being tested at a pre-set speed as it pulses at a pre-set rate. By setting the number of consecutive pulses required to trigger the system it is possible to predetermine the minimum length of defect which will be required to trigger the system and register an alarm.

Another feature of this invention allows adjustment of the time during which a defect signal may be received and cause the integrator alarm not to discharge. With this feature it is possible to make the testing system sensitive only to defects in a certain portion of the tested materials, thereby increasing its usefulness in certain kinds of tests.

Additional features of the invention relate to the provision of comparatively simple and inexpensive but highly reliable and effective circuit arrangements for obtaining the above-described discrimination against transient signals.

This invention contemplates other objects, features and advantages which will become more fully apparent from the following detailed description taken in conjunction with the accompanying drawings which illustrate a preferred embodiment and in which:

FIGURE 1 is a diagrammatic block representation of an ultrasonic testing system having a one-pulse recovery integrator alarm constructed according to the principles of this invention; and FIGURE 2 is a schematic electrical diagram of integrator, discharge, alarm and automatic gate circuits shown in block diagram in FIGURE 1.

Reference numeral 10 generally designates an ultrasonic testing system constructed according to the principles of this invention. In the system 10 a transducer 11 is pulsed periodically by a pulsing circuit 12 to induce ultrasonic energy pulses into a test body 13. Such pulses travel to a structural defect 13a, causing an echo from the defect 13a to be received by the transducer 11 and transmitted as an electrical signal through a gate circuit 14 to an amplifier circuit 15. Signals from amplifier are applied to an integrator 16, preferably by means of a monostable multivibrator 17 operative to develop an output pulse of a certain amplitude and duration in response to each input pulse above a certain threshold value applied thereto. The threshold value is preferably adjustable. Such pulses from the monostable multivibrator 17 are accumulated and stored by the integrator 16, until it is discharged by a discharge circuit 19.

The output of the integrator 16 is connected to an alarm circuit 20 having an output line 21 which may be connected to a reject mechanism or an alarm signal panel, and the alarm circuit 20 is so constructed that it requires a signal from the integrator circuit 16 representing the storage of a pre-set number of defect signals before it will trigger to emit an alarm signal at output line 21. The integrator 16 is also connected to one input of an automatic gate 22 which has another input connected to an unblanking circuit 23 and an output connected to the discharge circuit 19.

The pulsing circuit 12, gate circuit 14 and unblanking circuit 23 are controlled by a timing circuit 24. The system is so constructed that each time the transducer 11 pulses and a defect echo-pulse is received while the gate 14 is open, a signal is applied through the amplifier 15 to the monostable multivibrator 17. If the defect signal is above a pre-set threshold level, it will trigger the multivibrator 17 to produce a voltage pulse of a certain size and duration which is received by the integrator 16 and which develops a certain charge in the integrator, where the charge is stored until the integrator contains the amount of charge required to trigger the alarm circuit 20. If, however, the transducer 11 pulses but receives no defect signal large enough to trigger the multivibrator 17, the integrator 16 is automatically discharged and the storage process must begin anew.

When the timing circuit 24 causes the pulsing circuit 12 to pulse the transducer 11, it also causes the unblanking circuit 23 to emit a voltage pulse represented by the waveform 25. The leading edge or positive-going side of voltage pulse 25 enables the automatic gate 22. In its enabled state the automatic gate 22 will operate in response to the trailing or negative-going edge of the unblanking pulse to transmit a signal to the discharge circuit 19 to cause discharge of the integrator 16. However, if the automatic gate 22 receives a signal from the integrator circuit 16 representing the storage of a charge due to a defect signal, the gate 22 becomes disabled and the trailing or negative-going edge of the unblanking pulse 25 will not open the gate 22 to cause the discharge of the integrator 16, thereby allowing the integrator to remain charged.

Thus, each time the transducer 11 pulses, and a defect signal is stored in the integrator 16 during the positive portion of the unblanking pulse 25, the integrator 16 emits a signal which stops the automatic gate 22 from allowing a discharge of the integrator 16. However, if no signal is stored in the integrator 16 during the positive portion of the unblanking pulse 25, the automatic gate 22 opens and allows the integrator 16 to be discharged.

The testing system 10 therefore produces an alarm output in the presence of an actual defect 13a in the portion of the material 13 being tested, but is protected against unwanted alarm signals due to circuit transients, because the probability of the occurrence of transient signals large enough to trigger the alarm during a consecutive number of transducer pulses equal to the pre-set number required is generally very slight.

Referring now to FIGURE 2, the actual circuits of the integrator 16, discharge circuit 19, alarm circuit 20, and automatic gate 22 are shown. The alarm circuit operates in response to a certain level of input voltage applied thereto to develop an output signal at an output terminal 26. In particular, the alarm output terminal 26 is connected to ground through a resistor 27 and also to one base of a unijunction transistor 28 having its other base connected through a resistor 29 to a negative voltage source 30, which may be at −24 volts for example. The emitter of the transistor 28 is connected through a capacitor 31 to the negative voltage source 30 and through a resistor 32 to the collector of a transistor 33 connected through a resistor 34 to the negative source 30. The emitter of transistor 33 is connected to ground through a capacitor 36 and to the movable contact of a potentiometer 37 connected between ground and a resistor 38 connected to the negative source 30. The base of transistor 33 is connected to the emitter of a transistor 40 having a collector connected to the negative source 30 and having a base connected to ground through a storage capacitor 41 of the integrator 16.

In operation, a small current normally flows between the bases of unijunction transistor 28 causing the alarm output terminal 26 to be at a negative voltage, −6 volts for example. However, as negative defect signals are stored in capacitor 41 of the integrator 16, lowering its potential, the potential of the emitter of transistor 40 is lowered, causing increased conduction in transistor 33 and an increased collector potential thereof, thus raising the potential of the emitter of unijunction transistor 28. When the amount of stored charge on capacitor 41 of integrator 16 reaches a certain value which may be adjusted by adjusting potentiometer 37, the emitter of transistor 28 reaches a triggering potential and causes a decrease in resistance and a corresponding heavy current flow between the emitter and the base thereof, connected to resistor 29. A sharp voltage decrease, or alarm signal, results at the output terminal 26, which may be connected to an alarm panel or reject mechanism. The alarm signal indicates that a defect echo-pulse has been received in response to each of a pre-set number of consecutive pulses of a testing transducer as shown in FIGURE 1. Whenever an alarm signal is produced at output terminal 26, the signal causes a discharge of the integrator circuit 16 to prepare for subsequent operation of the integrator alarm system 10. In particular, output terminal 26 is connected to one terminal of a capacitor 43 in the discharge circuit 19, with the other terminal thereof being connected through a resistor 44 to ground and through a rectifier 45 to one terminal of a capacitor 46 connected through resistor 47 to ground. The other terminal of capacitor 46 is connected through a resistor 48 to the storage capacitor 41 and also to the cathode gate of a silicon controlled switch transistor 49, having an anode connected through resistor 50 to ground and having a cathode connected to the storage capacitor 41. When a negative voltage signal occurs at output 26 its leading or negative-going edge produces a negative voltage pulse from capacitor 43 which is transmitted through rectifier 45 and causes a substantial reduction of the voltage across capacitor 46. Rectifier 45 then serves to isolate capacitor 46 from capacitor 43 and to allow a current flow from ground through resistor 47 to one terminal of capacitor 46, thereby producing a positive voltage pulse at the other terminal of capacitor 46 which is transmitted to the cathode gate of the switching transistor 49. The switching transistor is turned on by this positive pulse, and the storage capacitor 41 is thereby discharged. After the discharge, when no voltage difference appears across the terminals of the switching transistor 49, the transistor ceases to conduct and the system is again ready to perform its integrating function.

The storage capacitor 41 of integrator 16 is connected through a diode 51 to one terminal of a capacitor 52 which is connected through a diode 53 to the base of transistor 33. The other terminal of capacitor 52 is connected through a resistor 53a to the negative voltage supply 30 and through a rectifier 54 to the emitter of a transistor 55 connected through a resistor 56 to the negative supply 30. The collector of transistor 55 is connected to ground and the base thereof is connected through a resistor 57 to the negative supply 30 and through a resistor 58 to the integrator input terminal 59.

When a negative defect signal represented by the waveform 60 is received at the integrator input terminal 59, it causes a sharp voltage decrease at the emitter of transistor 55 which is transmitted through diode 54, capacitor 52, and diode 51 to induce a negative charge on the storage capacitor 41. This negative charge remains on the storage capacitor 41 until the capacitor is discharged by the discharge circuit 19. To obtain a bootstrap operation, the capacitor 52 is discharged after a current pulse by current through diode 53 and transistor 40 to establish a voltage between its terminals such that there is substantially no potential drop across diode 51 when the next defect pulse arrives.

To control the automatic gate circuit 22 in response to defect pulses, the emitter of transistor 55 is also connected through a capacitor 62 to the line point 63, which is connected through a diode 64 to the negative supply 30 and through a resistor 65 to the cathode gate of a transistor switch 66 having a cathode connected to the negative supply 30, an anode gate connected through resistor 67 to the ground, and an anode connected through resistor 68 to the cathode of another switching transistor 69 having an anode connected through a resistor 70 to ground and an anode gate connected through a resistor 71 to ground.

The cathode gate of transistor switch 66 is connected through a resistor 73 to the negative supply 30 and through a resistor 74 to one plate of a capacitor 75 which is connected to the supply 30 through the parallel combination of the resistor 76 and the rectifier 77. The other plate of the capacitor 75 is connected to ground through a resistor 79 and to the collector of a transistor 80 having an emitter connected to the supply 30 and a base connected to the collector of a transistor 81 through the parallel combination of a resistor 82 and a capacitor 83.

The cathode gate of transistor switch 69 is connected through a resistor 84 to the supply 30 and through a resistor 85 to one terminal of a capacitor 86 which is connected to the supply 30 through the parallel combination of a resistor 87 and a rectifier 88. The other terminal of capacitor 86 connects directly to the collector of transistor 81, which connects through a resistor 89 to the negative supply 30. The base of transistor 81 is connected through a rectifier 91 to ground, through a resistor 92 to the supply 30, and through a resistor 93 to an input terminal 94 of the automatic gate 22.

Corresponding to each pulse of the testing transducer 11 of FIGURE 1 an unblanking pulse represented by the waveform 25 appears at the terminal 94 of the automatic gate 22. The positive-going side of this unblanking pulse 25 causes transistor switch 66 to conduct, and with transistor switch 66 so conducting the negative-going side of the unblanking pulse 25 causes transistor 69 to conduct, creating a negative signal at the anode which is connected through resistor 95 to the anode gate of transistor switch 49 and which causes the transistor switch 49 to conduct and discharge the storage capacitor 41. However, if a negative defect signal occurs at the input terminal 59 of the integrator 16 while the transistor switch 66 is conducting, a positive pulse is transmitted through capacitor 62 and resistor 65 to the cathode gate of transistor switch 66 to cut off the transistor. With transistor switch 66 cut off, transistor switch 69 will not be turned on by the negative-going side of the unblanking 25, and the storage capacitor 41 is not discharged. As long as a defect signal occurs during the positive portion of the unblanking pulse 25 and prevents triggering of switching transistor 66, the storage capacitor 41 is not discharged. If this happens during the required number of consecutive unblanking pulses, corresponding to consecutive pulses of the transducer 11, the alarm signal is produced as described earlier.

The positive-going side of the unblanking pulse 25 causes a decrease of conduction in transistor 81 and a voltage decrease at the collector thereof, which causes a decrease of conduction of transistor 80 and a positive signal at the collector thereof. This positive signal is transmitted through capacitor 75 and resistor 74 to the cathode gate of the switching transistor 66, causing the transistor to conduct and thereby lowering the potential of the anode thereof. In this stage, a negative signal from the capacitor 62 of the integrator 16 may be transmitted through the resistor 65 to the cathode gate of the transistor switch 66 to cut off the transistor.

If no signal is received from the integrator 16, however, the negative-going side of the unblanking pulse 25 causes an increase of conduction of transistor 81 and a subsequent voltage increase at the collector, which is transmitted through capacitor 86 and resistor 85 as a positive pulse to the cathode gate of transistor switch 69. If transistor 66 is conducting the cathode of transistor 69 is essentially at the voltage of the negative supply 30, −24 volts for instance, and the positive pulse at the cathode gate of transistor 69 causes the gate to be at a higher voltage than the anode and thereby turns transistor switch 69 on.

When transistor 69 turns on, the voltage at the anode thereof decreases sharply and a negative signal is transmitted through resistor 95 to the anode gate of the transistor switch 49, thereby causing the anode gate to be at a lower voltage than the anode and turning on transistor switch 49 to discharge storage capacitor 41.

If transistor switch 66 has been turned off by a defect signal from the integrator 16 before the positive pulse appears at the cathode gate of switching transistor 69, the voltage at the cathode of transistor 69 will be higher than the voltage of supply 30 to bias the cathode against being turned on by the positive pulse at the cathode gate. The transistor 69 does not turn on and there is no discharge of storage capacitor 41.

The transistor switch 66 and associated circuitry thus forms a first control means which is controlled from the unblanking pulse to be placed in a first conductive condition at the beginning of the time interval of the unblanking pulse and to be switched to a second condition in response to an input or defect signal during the unblanking pulse time interval, with the transistor switch 69 and associated circuitry forming a second control means operative when the aforesaid first control means is in its first condition at the end of the unblanking pulse time interval for developing an output signal. In the illustrated circuit, the output signal is applied directly to the transistor switch 49 to render it conductive and to discharge the capacitor 41 to an initial condition of charge. It should be noted, however, that the circuit could be arranged so that two or more output signals from the transistor switch 69 would be required for causing discharge of the capacitor 41. For example, a flip-flop or counter circuit could be interposed between transistor switch 69 and transistor switch 49. It should also be noted that although the use of the capacitor 41 as a storage means is highly desirable in the illustrated circuit, other forms of storage means might be used such as counters and the like.

Although the integrator circuit has a variety of applications, it is particularly desirable in a non-destructive testing system such as the illustrated ultrasonic system in which relative scanning movement takes place between a part being inspected and a probe or other sinsing means operative to develop a defect signal, in that the circuit can be readily adjusted to respond to a desired number of successive defect signals, to thus indicate the relative size or magnitude of a defect, while at the same time being insensitive to transient signals. Thus, it will be understood that in the illustrated system, the transducer 11 may be moved by a suitable scanning mechanism and, if desired, both the transducer 11 and the part 13 may be immersed in water or another liquid providing a suitable couplant between the transducer and the part.

By way of illustrative example, and not by way of limitation, the circuit components may have values according to the following table, wherein the values of resistors are in ohms, with "K" representing thousands of ohms and "M" representing megohms, and wherein the values of capacitors are in microfarads unless preceded by "pf.," indicating picofarads.

| Reference numeral: | Value |
|---|---|
| 27 | 3.3K |
| 29 | 470 |
| 31 | 0.0033 |
| 32 | 15K |
| 34 | 68K |
| 36 | 0.1 |
| 37 | 5K |
| 38 | 15K |
| 41 | .1 |
| 43 | .1 |
| 44 | 10K |
| 46 | .001 |
| 47 | 10K |
| 48 | 3.3K |
| 50 | 1K |
| 52 | .005 |
| 53a | 18K |
| 56 | 3.9K |
| 57 | 56K |
| 58 | 10K |
| 62 | pf.. 560 |
| 65 | 3.3K |
| 67 | 100K |
| 68 | 1.5K |
| 70 | 18K |
| 71 | 100K |
| 73 | 3.3K |
| 74 | 10K |
| 75 | pf.. 180 |
| 76 | 10K |
| 79 | 6.8K |
| 82 | 100K |
| 83 | pf.. 100 |
| 84 | 3.3K |
| 85 | 10K |
| 86 | pf.. 180 |
| 87 | 10K |
| 89 | 6.8K |
| 92 | 56K |
| 93 | 27K |
| 95 | 10K |

It will be understood that modifications and variations may be effected without departing from the spirit and scope of the novel concepts of this invention.

We claim as our invention:

1. In an integrator circuit for a measurement system wherein signals to be measured are developed during certain time intervals, a storage capacitor, means for applying said signals to said storage capacitor to change the charge of said capacitor a certain amount in response to each of said signals, a trigger circuit operative when the charge of said capacitor reaches a certain level for developing an output signal, a transistor switch device connected in generally parallel relation to said capacitor and having cathode and anode gate electrodes, means responsive to said output signal for applying a signal to one of said gate electrodes to cause conduction of said device and to discharge said capacitor to a certain initial level, and means responsive to the absence of a signal to be measured during at least one of said time intervals for applying a signal to the other of said gate electrodes for discharging said capacitor to said certain initial level.

2. In a system in which signals to be detected are developed during periodically repeated time intervals, an integrator circuit for discriminating against noise signals, comprising: a storage capacitor, means for applying said signals to said storage capacitor to change the charge of said capacitor a certain amount in response to each of said signals, a trigger circuit operative when the charge of said capacitor reaches a certain level for developing an output signal, electronic switch means connected in generally parallel relation to said capacitor, first control means responsive to said output signal to apply a signal to said electronic switch means to cause conduction therethrough and to discharge said capacitor to a certain initial level, and second control means responsive to the absence of a signal to be measured during at least one of said time intervals to apply a signal to said electronic switch means and to cause conduction therethrough and to discharge said capacitor to said certain initial level.

References Cited

UNITED STATES PATENTS

| 2,491,904 | 12/1949 | Poole | 328—127 |
| 2,686,008 | 8/1954 | Davidon | 328—48 |
| 2,693,105 | 11/1954 | Straehl | 328—186 |
| 2,924,712 | 2/1960 | Edens | 328—127 |
| 3,264,480 | 8/1966 | Zuck | 328—127 |
| 3,251,058 | 5/1966 | Sutcliffe | 328—127 |
| 3,351,784 | 11/1967 | McNulty | 307—305 |

ARTHUR GAUSS, Primary Examiner

H. A. DIXON, Assistant Examiner

U.S. Cl. X.R.

328—120, 127